United States Patent [19]

Dolan

[11] 4,261,470
[45] Apr. 14, 1981

[54] COLLAPSIBLE RACK

[76] Inventor: Donald L. Dolan, 541 North Wisconsin Street, Hobart, Ind. 46342

[21] Appl. No.: 34,963

[22] Filed: May 1, 1979

[51] Int. Cl.³ .............................................. A47F 5/13
[52] U.S. Cl. .................................. 211/191; 108/111; 211/182; 403/235; 403/237
[58] Field of Search .............. 211/182, 191, 208, 192, 211/187; 403/235, 236, 237, 233, 191; 108/111

[56] References Cited

U.S. PATENT DOCUMENTS

| 2,879,087 | 3/1959 | Haglund | 211/182 UX |
| 2,935,210 | 5/1960 | Cohen | 211/208 X |
| 3,362,738 | 1/1968 | Dygert et al. | 211/192 X |

*Primary Examiner*—Roy D. Frazier
*Assistant Examiner*—Robert W. Gibson, Jr.
*Attorney, Agent, or Firm*—Shoemaker and Mattare

[57] ABSTRACT

A rack which is easily knocked down and set up comprises a base and corner standards releasably attached to that base. A plurality of rails are releasably coupled to the corner standards. The rack can also be used as a skid and coupling members are disclosed which quickly and easily attach the rails to the corner standards. Several forms of the coupling members are disclosed.

12 Claims, 11 Drawing Figures

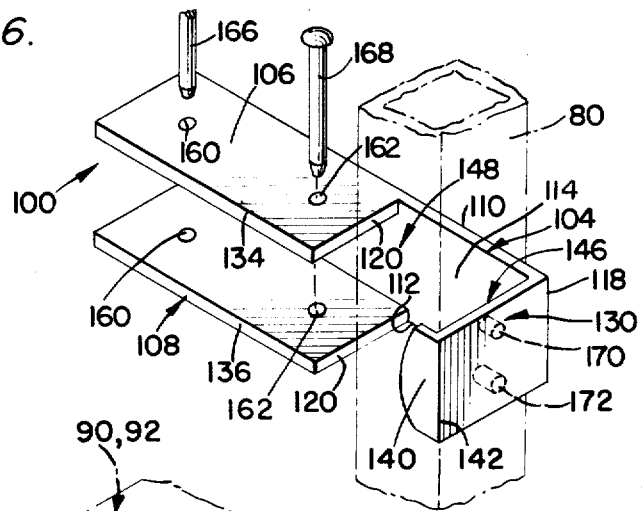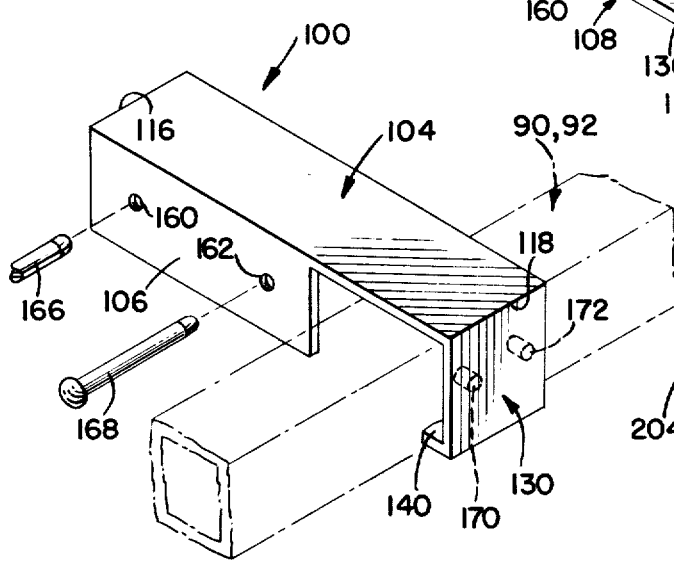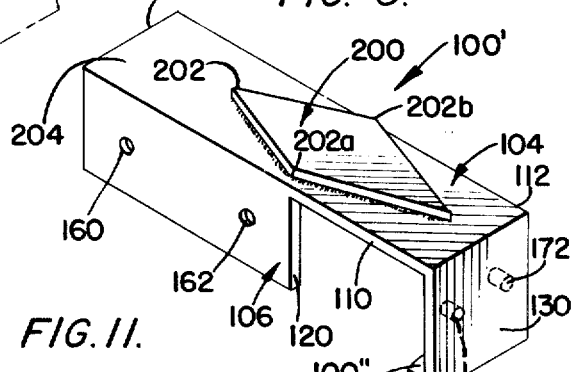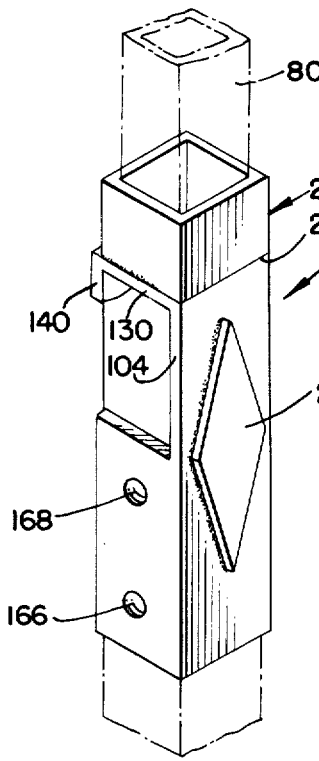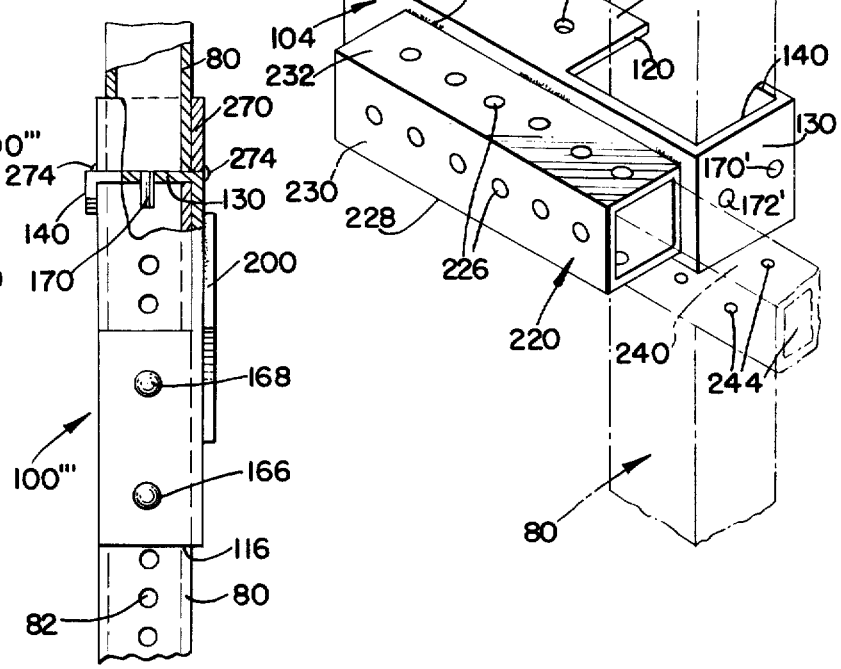

COLLAPSIBLE RACK

BACKGROUND OF THE INVENTION

The present invention relates in general to racks, and, more particularly, to knockdown racks.

Storage and shipment racks are commonly used in many industries, and especially the automative industry. Examples of such racks are disclosed in U.S. Pat. Nos. 2,746,176, 2,877,602, 3,022,896, 4,010,849 and 4,098,409. Some form of skid is also used in many industries, and examples of such skids are disclosed in U.S. Pat. Nos. 2,817,304 and 2,828,931.

However, the known racks and skids are not universally applicable to both functions as well as to use with a wide variety of items, or a wide variety of shapes and/or sizes of items. Thus, some racks will accommodate long items, while other racks will accommodate small items, or the like. Due to the difficulty of assembly and/or disassembly of known devices, these devices are not easily modified to accommodate such a wide variety of shapes and sizes. Furthermore, the size of most known devices is not readily altered.

A further drawback to known devices is the inability of a rack or skid to serve easily as the other device, that is, known racks are not easily modified to be skids, and vice versa. Such a drawback produces added costs due to a requirement of extra equipment, as well as labor costs involved in transferring items from a rack to a skid, and/or vice versa.

Yet a further drawback to presently known racks is the difficulty required in assembling and disassembling such racks. Special tools and skills are often required. Thus, a damaged rack may prove to be quite expensive, even if the damage is slight. Furthermore, due to the difficulty of assembling and/or disassembling such known racks, such racks are generally returned to a shipper in an assembled configuration. This presents numerous problems in space, cost, and the like. As such, return of shipping racks presents a serious problem and drawback to known racks. Such problems inhibit the use of such racks. In addition to this, most known racks are quite heavy and bulky and thus the shipping problems are further exacerbated.

Furthermore, damaged rack parts are generally discarded due to the difficulties involved in assembling and disassembling known racks, and due to the non-adaptability of these known racks. Discarding components that are only slightly damaged, but still perfectly serviceable, can considerably increase costs involved, and represents an unnecessary cost factor.

For the above reasons, known racks and skids have drawbacks that seriously inhibit the use thereof in a universal manner.

SUMMARY OF THE INVENTION

The rack embodying the teachings of the present invention is easily knocked down and reassembled, and is easily adapted to storing and/or transporting a wide variety of items, and is therefore usable in a universal manner.

The preferred form of the rack includes a rectangular base with stirrups on the sides and ends for receiving lifting forks. Corner standards stand upwardly from the corners of the base and each corner standard has a plurality of fastener receiving holes defined therein. The corner standards are square in transverse cross-section and are elongate with the holes thereof being longitudinally spaced apart from each other along the longitudinal centerline of each corner standard.

A plurality of rails are detachably coupled to the corner standards and each rail has a plurality of fastener receiving holes defined therein. The rails are hollow, elongate and have a square transverse cross-section. Some of the rails form end rails for the rack, and some of the rails form side rails for the rack.

Coupling members releasably couple the rails to the corner standards. Each of the coupling members has a rectangular base and a pair of parallel side flanges extending in a common direction from that base and has inner edges spaced from the ends of the base. A locking flange is integrally attached to one end of the base and has a locking lip integrally mounted thereon to extend toward the side flanges.

Fastener receiving holes are defined in the side flanges and fasteners are mounted on the locking flange.

The flange mounted fasteners of the coupling members are received in the corner standard holes, and fasteners fit through the side flange holes and through rail fastening receiving holes to couple the rails to the coupling members, and thereby to the corner standards and to each other.

The coupling members can include strengthening members and fittings for permitting one corner standard to be stacked edge on edge onto another.

The rack is quickly and easily assembled by simply mounting the corner standards onto the base, attaching the coupling members to the corner standards, then attaching the rail to the coupling members. Any rack height can be easily set, and any rail arrangement and location can be easily set to accommodate the items carried by the rack.

The base of the rack can serve as a skid, and the forklift accommodating stirrups can be used to move a loaded skid about with a forklift, or the like.

The rack thus has a light, yet strong construction and is easily assembled and disassembled. Thus, once a particular shipment has been made, the rack can be disassembled and returned to the shipper for reuse. Costs are reduced correspondingly. The rack can serve as a convenient storage means as well through the skid function thereof, or can simply be used as a storage rack in the set up condition. Reuse of the rack and the ease with which it is set up and knocked down keeps the rack in continuous use and thereby saves costs as well as storage space at both the shipping and receiving locations.

The rack is extremely versatile and has numerous applications, especially in the automotive industry. The strong, yet light construction of the rack, and especially the base thereof, make this rack amenable to many uses. Any configuration of stamping or shipping requirements can be easily accommodated. The size and shape of the rack can also be quickly and easily changed to meet special requirements.

The coupling members used in this rack are easily manufactured, used and stored and are extremely versatile. The rack is thus quickly and easily assembled without the use of special hand tools, and does not require any special skills or hand dexterity. Thus, a single, unskilled person can assemble or disassemble the rack.

The coupling members and fasteners can also be easily manufactured for special uses.

The rails and standards of the rack prevent items from bumping into each other during shipment and/or storage. The rails can be staggered, that is, end rails can alternate with side rails, or be in groups of two or more, or side rails can be in groups of two or more between end rails, or the like, so that shipped items can be separated by spaces or the like, or can be suspended within the rack. Spacers can be used with the rack and can be in the form of separator bars which extend lengthwise or widthwise of the rack and can be coupled to the rails to define "compartments" for the items on the rack. The rails can also be located in co-planar arrangements so that those rails can serve as shelves for items which are longer and/or wider than the rack. Such items as automotive panels are thus easily accommodated by the rack of the present invention. Many kinds of stampings can also be accommodated by this rack.

The readily separable nature of the rack components permits easy replacement and/or repair of damaged components. Thus, a damaged corner post or rail can be removed, and repaired or cut down for use in special applications. Repair costs are thus minimized and maximum use of materials is made.

Liners, such as cardboard or the like, can be included on the rack to accommodate small parts, and protect delicate items from damage through contact with the rack or with other items.

The rack of the present disclosure can be used as a skid as well due to the configuration thereof.

The various components of the presently described rack are all very easily manufactured and thus further reduce the costs inherent in the rack.

The ease with which the rack is assembled reduces pre-built fleet preparation for anticipated production. This ease of assembly also eliminates lost production man hours due to non-availability of shipping containers as the rack can be prepared as needed. The versatility of the rack also eliminates waste of material due to unused racks requiring storage.

The ease of assembly of the rack of the present invention also reduces safety hazards and downtime related to alleviating safety hazards caused by bringing stored racks into a plant from a storage area which may be located out-of-doors. Presently known racks are often stored out-of-doors and therefore exposed to ice and snow, and the like. The present rack can have the components thereof stored indoors, and hence out of such elements.

OBJECTS OF THE INVENTION

It is, therefore, a main object of the present invention to provide a knockdown rack which can accommodate a wide variety of items and uses.

It is another object of the present invention to provide a knockdown rack which is easily and quickly set up and knocked down.

It is a further object of the present invention to provide a knockdown rack which does not require special hand tools or special skills to assemble or disassemble.

It is yet another object of the present invention to provide a knockdown rack which is easily modified for various applications.

It is still another object of the present invention to provide a knockdown rack in which the dimensions can be easily changed.

It is still a further object of the present invention to provide a knockdown rack which easily accommodates strengthening and stiffening members.

It is yet a further object of the present invention to provide a knockdown rack in which damaged parts are easily removed and/or replaced.

It is another object of the present invention to provide a knockdown rack which can also be used as a skid.

It is a further object of the present invention to provide a knockdown rack in which all of the parts thereof are easily manufactured.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIGS. 6 and 7 are perspective views of two orientations of a coupling member used in the rack embodying the teachings of the present invention.

FIG. 8 is a perspective view of another form of a coupling member used in the rack embodying the teachings of the present invention.

FIG. 9 is a perspective view of another form of a coupling member used in the rack embodying the teachings of the present invention.

FIG. 10 is an elevation view of the FIG. 9 coupling.

FIG. 11 is a perspective view of another form of the coupling used in the rack embodying the teachings of the present invention.

DETAILED DESCRIPTION OF THE INVENTION

Figure 1:
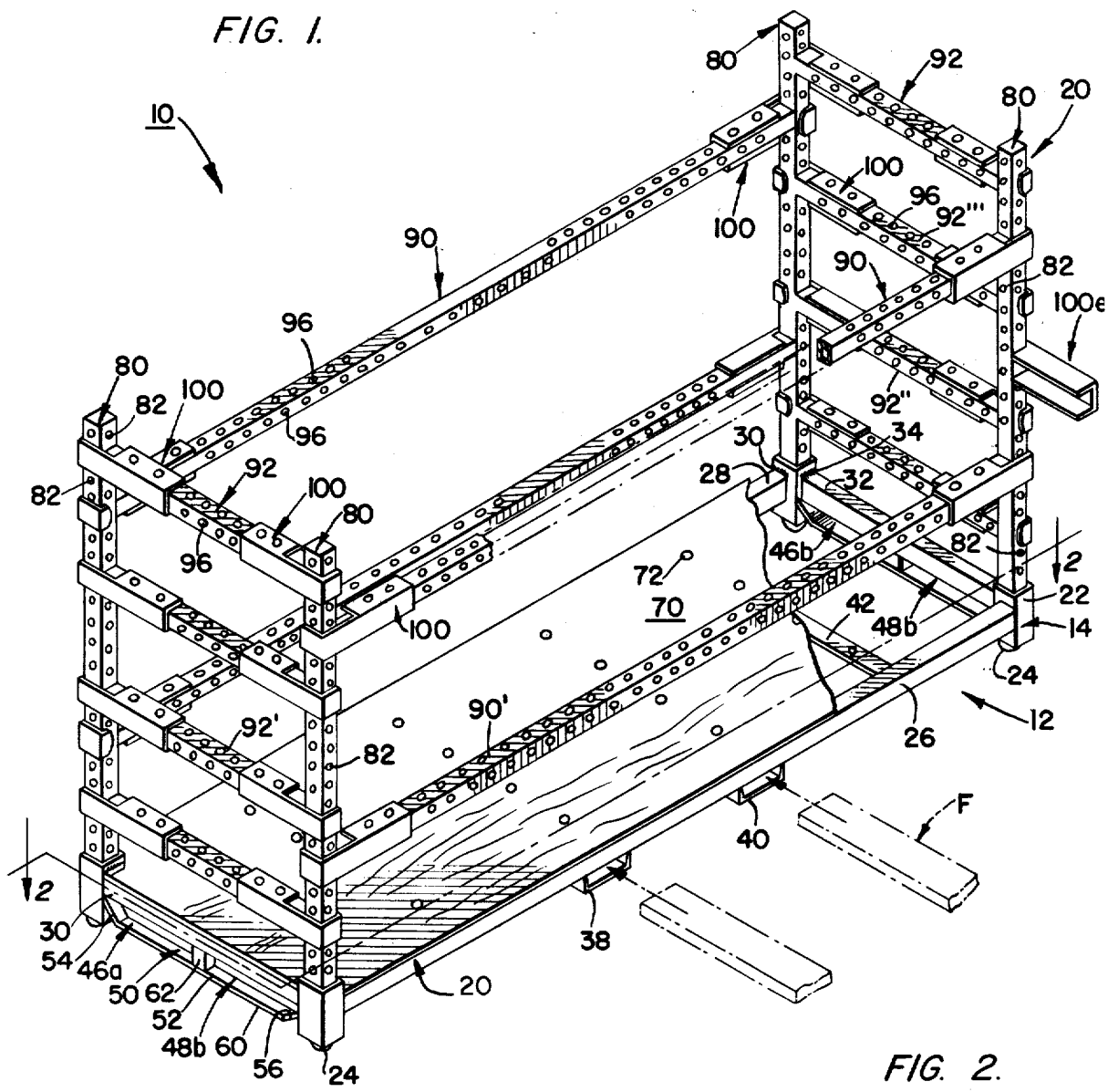
FIG. 1 is a perspective of a rack embodying the teachings of the present invention.

Shown in FIG. 1 is a collapsible, or knockdown rack 10 which can be used for transporting and storing items, especially those items used in the automotive industry. The collapsible rack 10 includes a pallet or base 12 supported on a surface by legs 14. A frame 20 is supported on the base to extend upwardly therefrom.

The base 12 is rectangular and includes a plurality of hollow leg couplings 22 on the corners thereof. The couplings are elongate and square in transverse cross-section. Feet 24 are mounted on the bottom of the couplings to support the rack on a surface, such as a floor, or the like, when desired. A pair of elongate longitudinal side tubes 26 and 28 are end attached as by welds 30, or the like, to the leg couplings 22. The tubes 26 are rectangular in transverse cross-section in a preferred embodiment of the rack 10. A pair of elongate end tubes 30 and 32 are end attached, as by welds 34, or the like, to the leg couplings 22 to define a rectangular peripheral shape for the base 12. The side and end tubes are attached to the leg couplings to define a gap between the feet 24 and the bottom of the tubes so there will be a clearance gap between the bottom of the tubes and the support surface.

It is here noted that while the shapes shown in the figure for the rack and the various elements of that rack are preferred, other shapes can be used without departing from the scope of the present disclosure.

Figure 2:
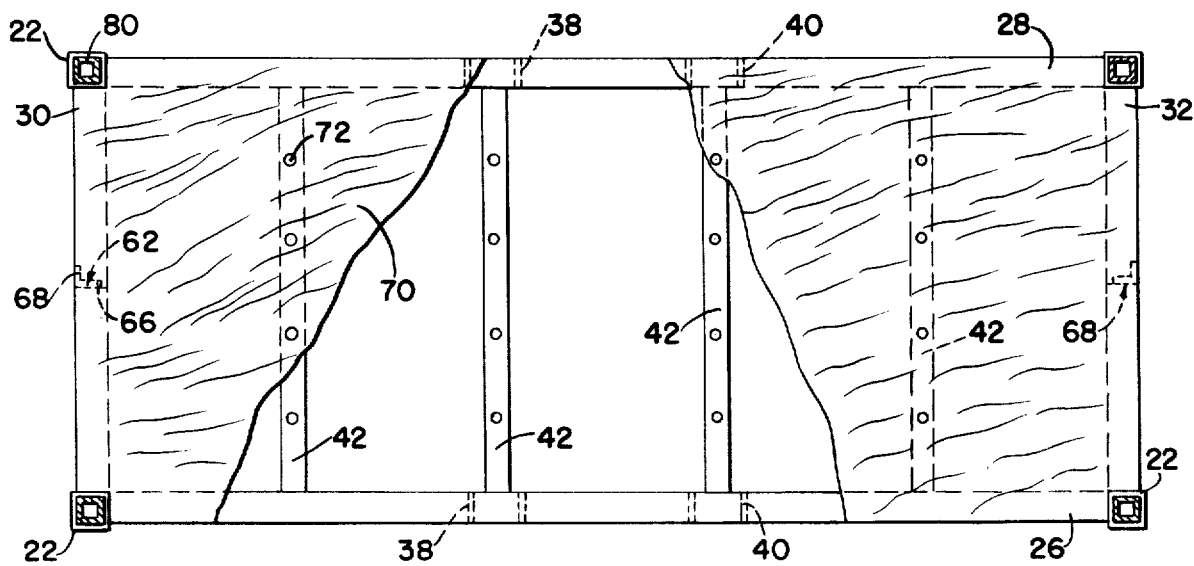
FIG. 2 is a view along line 2—2 of FIG. 1.

A pair of liftfork stirrups 38 and 40 are mounted near the longitudinal centerline of each of the side tubes. The stirrups are mounted to be on opposite sides of the longitudinal center as best shown in FIG. 2. The stirrups are located and spaced to receive the forks F of a lift fork, or the like, so that the rack 10 can be lifted and transported in the manner of a skid.

A plurality of transverse stiffeners 42 are end attached to the side tubes and span the width of the base. As shown in FIG. 2, there are four stiffeners which are equally spaced along the length direction of the base; however, more or less stiffeners could be used without departing from the scope of the present invention.

End lift stirrups 46 and 48 are located on the ends of the base to receive forks of a lifting device so the rack/skid can be lifted from either sides or the ends, whichever is more convenient. As shown in FIG. 1, each of the end stirrups includes a channel bar 50 having a central web 52 and a pair of upturned ends 54 and 56 which are connected, as by welds, or the like, to the leg couplings 22 at a location immediately subjacent the end tube ends. The channel bar 50 is dimensioned so that the lower surface 60 thereof clears the support surface when the rack 10 rests on feet 24. An angle bar 62 is medially located on the bar 50 to support that bar and define the two lift stirrups 46a and 46b and 48a and 48b as indicated in FIG. 1. The angle bar has a base 66 oriented to extend longitudinally of the bar 50 and a leg 68 oriented to extend transversely of the bar 50.

The pallet 70 is supported on the base 12 and, as shown in FIGS. 1 and 2, is preferably wood, or the like. A plurality of fasteners 72 connect the pallet to the stiffeners. Other fasteners can be used without departing from the scope of the present disclosure. Items, such as automotive parts, or the like, are supported on the pallet during storage and/or transport thereof.

Because of the configuration of the base 12, that base can be used as a skid on which to store items and/or to move items. The rack 10 thus has versatility added thereto.

As best shown in FIG. 1, a plurality of corner standards 80 are mounted in the leg couplings 22 to extend upwardly therefrom. The corner standards 80 are elongate, hollow and square in transverse cross-section. A multiplicity of attaching holes 82 are defined in each longitudinal side face of each standard to be spaced apart from each other longitudinally on or near the longitudinal centerline of the faces of the standard. The holes 82 extend from at or near each end of each standard for essentially the entire length thereof to at or near the other end of each standard. The holes 82 are easily spaced from each other in the preferred embodiment, but other spacings can be used if so desired. The purpose of the holes 82 will be discussed below.

As shown in FIG. 1, rack 10 includes a plurality of horizontal, vertically spaced side rails and a plurality of horizontal, vertically spaced end rails 92 coupled to the corner standards 80. The rails 90 and 92 are each elongate, hollow and square in transverse cross-section. Each rail includes a multiplicity of attaching holes 96 defined in each longitudinal face thereof to be spaced apart from each other longitudinally on or near the longitudinal centerline of each face of the rail. The holes 96 extend from at or near each end of the rail for essentially the entire length thereof to at or near the other end of each rail. The holes 96 are evenly spaced from each other in the preferred embodiment, but other spacings can be used if so desired. The function and operation of the holes 96 will be discussed below.

The side and end rails 90 and 92 are releasably attached to the corner standards by coupling members 100 detachably coupled to the ends of the rails and to the corner standards. The rails are shown in several configurations in FIG. 1 to illustrate the variety of arrangements possible.

Thus, the end and side rails can be alternated, as indicated for rails 90' and 92', or the end or side rails can be paired, as indicated for rails 92" and 92'". The shape of the rack 10 can thus be altered to accommodate the material being stored and/or transported on the rack/skid device 10. The staggered arrangement permits item on the rack to be spaced by spacer means which can be easily attached to the rails if so desired, or the items can be attached to the rails with the rails being co-elevational and serving as shelves if so desired. The spacer means, or means for attaching the items to the rails, can include fasteners which are received in the rail or standard holes. The possibilities are quite large and will readily occur to those skilled in the art upon reading this disclosure.

A coupling member 100 is best shown in FIGS. 6 and 7 and includes an elongate rectangular base 104 having a pair of side flanges 106 and 108 extending outwardly from opposite side edges 110 and 112, respectively, of the base. The flanges are in spaced parallelism with each other and are essentially rectangular in peripheral outline. The flanges are oriented to have the width dimension thereof extending outwardly of the base inner face 114 and to have the length dimension thereof extending essentially parallel to that base inner face. The flanges extend from at or near end 116 of the base to a location spaced from the other end 118 of the base. In a preferred embodiment, the flanges extend for just over half of the length of the base. There is thus a spacing between inner end 120 of each of the flanges and end 118 of the base.

A capturing flange 130 is integrally attached to the base 104 at end 118 thereof. The capturing flange is rectangular in peripheral outline and has one end thereof attached to end 118 of the base and extends outwardly from the inner face of the base to a location essentially co-planar with outer side edges 134 and 136 of the side flanges 106 and 108. The capturing flange 130 is oriented to have the width dimension thereof essentially parallel with the width dimension of the base flange and the length dimension thereof essentially perpendicular to the inner face of that base flange.

A lip 140 is intergrally mounted on outer end edge 142 of the capturing flange and extends from that flange toward the flanges 106 and 108 to be essentially parallel with the inner face of the base 104. A first capture channel 146 is thus defined by the lip, the capture flange and the base. A second capture channel 148 is defined by inner end edges 120 of the side flanges, base 104, the capture flange and the lip 140. As indicated in FIGS. 1 and 6, a corner standard 80 or one of the rails 90 or 92 is captured by these capture channels. FIG. 6 shows the coupling member oriented with base 104 vertically oriented and FIG. 6 shows the coupling member oriented with the base 104 horizontally oriented, and other orientations can be used if so desired. The coupling member is attached to a corner standard in FIG. 6, but can attach to other rails if so desired.

Each side flange has a pair of spaced fastener receiving holes 160 and 162 defined therein. The holes of the side flanges are defined to be spaced apart along the longitudinal centerline of each flange and the holes of flange 106 are aligned with the holes of flange 108 to receive fasteners 166 and 168 therethrough. The fasteners can be cotters, bolts, retaining pins or the like.

As best shown in FIGS. 3-6, a pair of fasteners 170 and 172 are defined in capturing flange 130 to be spaced apart transversely of that flange at or near the transverse centerline thereof. The fasteners extend inwardly of the capturing flange toward end 116 of the base 104. The fasteners are stationary pins in the preferred form of the rack 10.

Figure 3:
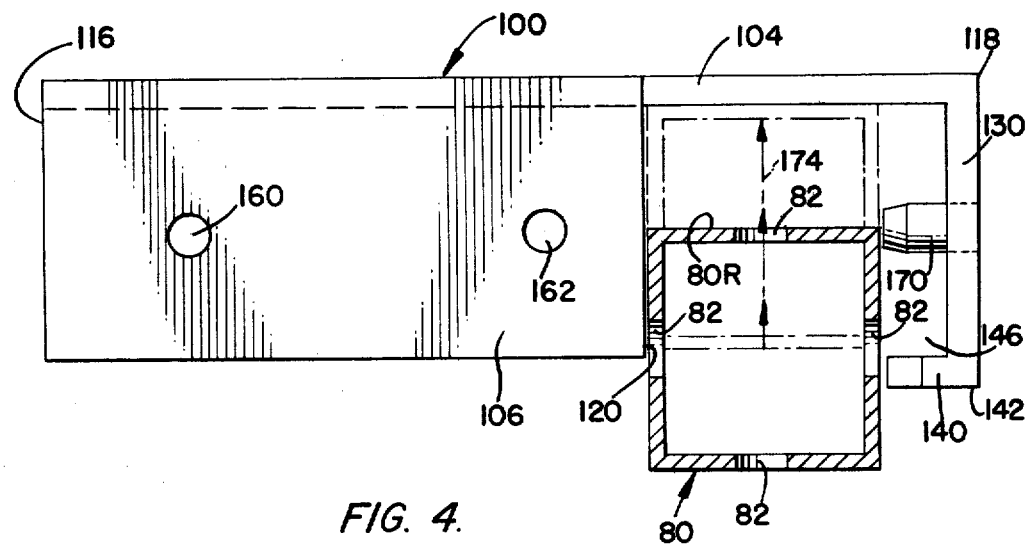
FIGS. 3–5 are plan views showing a rail and standard being attached to a coupling member of the rack embodying the teachings of the present invention.
Figure 4:
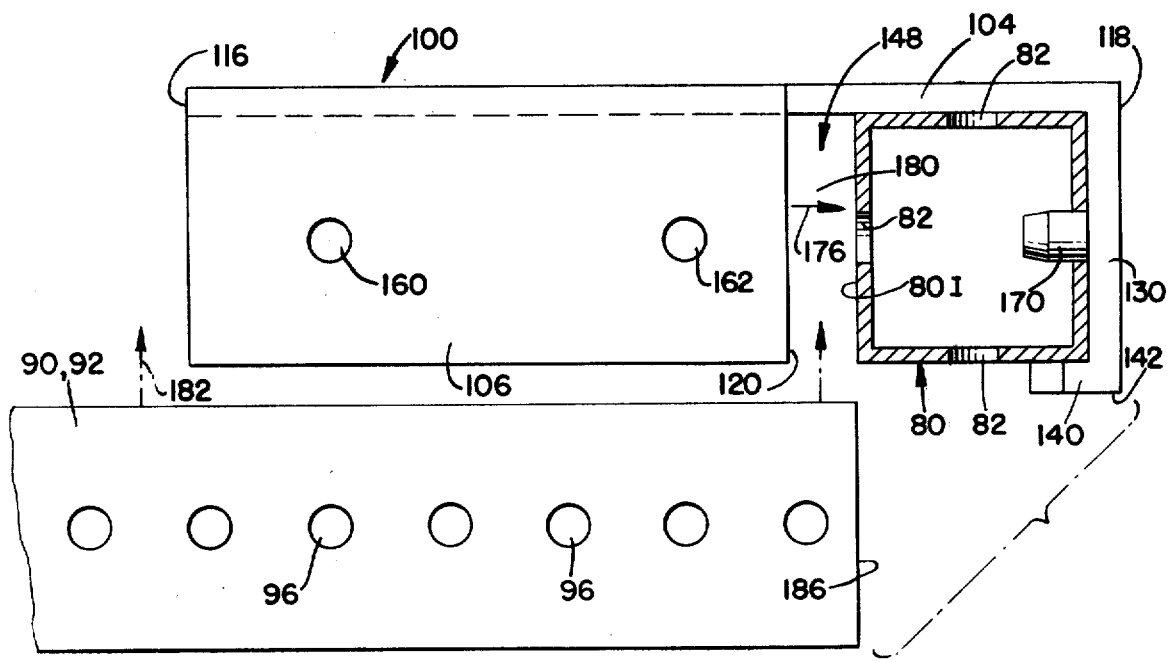
Figure 5:
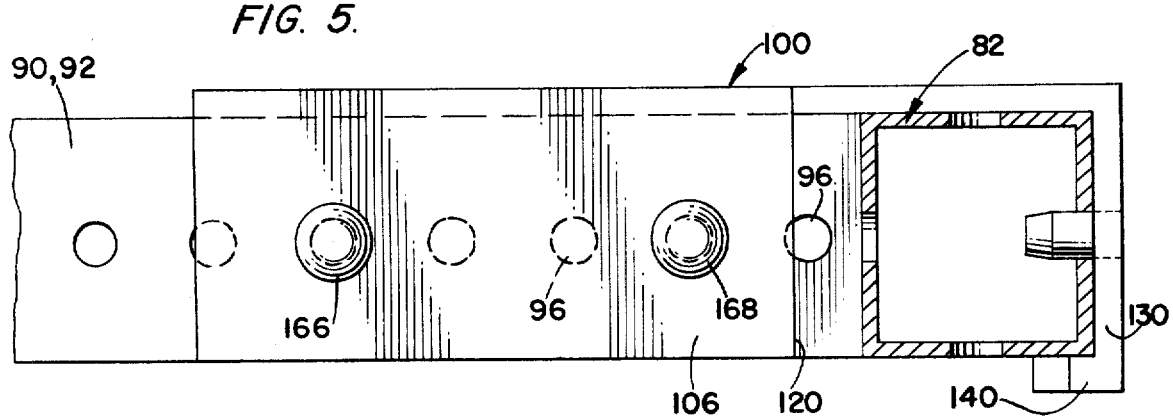

As best shown in FIGS. 3–5, a coupling member 100 is attached to a corner standard in a three-step process. The corner standard 80 is first inserted through the gap defined by the lip 140 and inner edges 120 of the side flanges as indicated by the solid lines in FIG. 3. The standard is next advanced into that gap as indicated by arrow 174 in FIG. 3 until one face, indicated by the reference numeral 80R in FIG. 3, contacts the inner face of the base 104, as indicated by the phantom lines in FIG. 3. The coupling and standard are then shifted with respect to each other as indicated by arrow 176 in FIG. 4 to engage the fasteners 170 and 172 into a pair of corresponding fastener receiving holes 82 on the standard. The lip 140 is spaced from the base 104 a distance approximately equal to the width of the standards so that the inner surface of the lip 140 snugly engages the outer surface of the standard to securely hold the standard in the position indicated therefor in FIG. 4. A gap 180 is thus defined between inner face 80I and the inner edges 120 of the side flanges. The coupling member 100 is thus securely held on the standard.

As indicated by arrow 182 in FIG. 4, a rail 90 or 92 is coupled to the coupling member after that coupling member is attached to a corner standard. The rail is oriented so that the inner end 186 thereof will flushly engage inner face 80I of the standard and then advanced into the coupling member between the side flanges. The side flanges are spaced from each other a distance so that the inner surfaces of those flanges snugly engage the outer surfaces of the rail. Of course, it is evident from these figures that the rail will be oriented to be essentially perpendicular with respect to the standards, or the element captured by the lip 140 and fasteners 170 and 172. The fastener receiving holes 96 of the rail are oriented to align with the aligned holes 160 and 162 of the side flanges so that the fasteners 166 and 168 will couple the rail to the coupling member side flanges and hence to the standard via the coupling member 100. The fully assembled coupling member is shown in FIGS. 1 and 5. Assembly is similar for the horizontal orientation shown in FIG. 7, and indeed, for any other orientation of the coupling member. Assembly and disassembly are similar processes, and both can be effected rapidly and surely. Thus, setup and knockdown of the rack 10 is convenient and use and reuse of the rack is expeditious and encouraged.

The rack can be assembled to have any height and/or rail configuration by simply selecting suitable fastening holes in the corner standards and/or the rails. Thus, a wide variety of items can be accommodated on the rack 10.

The rack can also be widened or lengthened by adding rails and couplings. A widening coupling is shown in FIG. 1 as 100e. In this manner, the rack can be altered to meet any function. A single base can thus have a variety of applications due to the widening and lengthening aspects of couplings, such as coupling 100e, and various layers on a single base can have various dimensions. As will be discussed below, the coupling 100e can have any of the forms disclosed herein for the coupling 100.

An alternative form of a coupling member is shown in FIG. 8 and denoted by the reference indicator 100'.

The coupling member 100' includes a strengthening member 200 which is in the form of a diamond-shaped aircraft splice having 60 degree apexes 202 in the preferred form thereof. The aircraft splice is mounted on the outer surface 204 of the base 104 and has a first pair of apexes 202a and 202b aligned with the inner end edges 120 of the side flanges. These first apexes are also spaced from the side edges 110 and 112 of the base 104 and thus the strengthening member 200 adds considerable strength to the coupling member.

Another form of a coupling member is shown in FIG. 11 and indicated by the reference indicator 100''. A tie-off fastener 220 is mounted, as be welds 224, or the like, to the outer surface 204 of the base. The tie-off fastener 220 is elongate, hollow and square in transverse cross-section. The tie-off fastener is smaller than the standards or the rails. A multiplicity of attaching holes 226 are defined in each of the outer faces 228, 230 and 232 of the tie-off fastener. These holes are spaced apart longitudinally of the fastener and are located on or near the longitudinal centerline of the fastener faces. The holes extend nearly the entire length of the fastener, and are preferably evenly spaced. However, other configurations can be used if so desired. As also indicated in FIG. 8, the fastener pins 170' and 172' are oriented to be spaced apart along the width dimension of the flange 130 as opposed to be spaced apart along the length dimension of that flange as in couplings 100 and 100'.

An elongate tie-off bar 240 is telescopingly received in the tie-off fastener. The tie-off bar can be a side bar parallel to the side rails 90, or an end bar parallel to the end rails 92 of the rack. The tie-off bars will be horizontally disposed and vertically spaced if the FIG. 6 or FIG. 7 coupling members are used, but can be vertically disposed if so desired. The tie-off bars are elongate, hollow and square in transverse cross-section and sized to be snugly received in the tie-off fasteners. Each tie-off bar includes a multiplicity of attaching holes 244 defined in each or at least one face to be spaced apart a distance corresponding to the spacing of the holes in the tie-off fastener. The attaching holes 244 are spaced apart from each other longitudinally on or near the longitudinal centerline of the face of the tie-off bar. The holes 244 extend from at or near each end of the tie-off bar for essentially the entire length of that bar to at or near the other end of the tie-off bar. The holes 244 are evenly spaced in the preferred embodiment, but can be otherwise if so desired. The tie-off bars are inserted into the tie-off fasteners, and the holes 244 are aligned with the holes 226 of the fastener.

Fastening members, such as pins, bolts, or the like, are inserted through the aligned holes to attach the tie-off bars to each other and/or to the rails and/or to the corner standards via the coupling member 100''. The tie-off fastener also adds further strength to the coupling member 100''.

It is also noted that the coupling member 100'' can be used to keep items on the rack separated. A telescoping tie-off bar 240 can be used as a spacer or bumper member to keep items on the rack from moving. These tie-off bars can also act as "bumpers" to protect the outermost edges or surfaces of such items.

Another form of the coupling member is shown in FIGS. 9 and 10 and is denoted by the reference indicator 100'''. The coupling member 100''' includes a strengthening member 200 and an end fitting 270 attached as by spot welds 274, or the like, to the outer surface of lip 130. The fitting 270 is tubular and square in peripheral shape. The outer periphery of the fitting is essentially flush with the outer periphery of the lip 130 as shown in FIGS. 9 and 10, but is slightly offset from the lip 140 in the preferred embodiment. However, other configurations can be used if desired. The fitting 270 is sized to snugly receive a corner standard 80 as indicated in FIGS. 9 and 10 to thereby stack corner standards upon each other for increasing the height of the corner standards and of the rack 10. The strengthening member insures that the weight added to the coupling member 100''' because of the stacked configuration will not buckle that coupling member, or cause a shifting thereof to thereby shift coupled corner standards with respect to each other.

As indicated in FIG. 10, a coupling member 100' can be modified by adding the fitting 270 thereto, or a separate coupling member, without the fasteners 170 and 172 thereon, can be used if desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A knockdown rack comprising:
   an elongate base;
   a plurality of elongate corner standards each attached to a corner of said base and each having a multiplicity of fastener receiving holes defined therein and spaced apart longitudinally of said each corner standard;
   a plurality of elongate rails each releasably coupled to a pair of said corner standards and each having a multiplicity of fastener receiving holes defined therein and spaced apart longitudinally of said each rail;
   a plurality of coupling members releasably coupling said rails to said corner standards, each coupling member including an elongate base having sides and ends, a pair of side flanges extending in a common direction from said base sides and each having an inner edge spaced from said base ends, a locking flange on one end of said base and oriented to extend in said common direction and essentially perpendicular to said side flanges, and a locking lip on one end of said locking flange extending toward said side flange inner edges and spaced from said inner edges, said side flanges having fastener receiving holes defined therein so that fastener receiving holes of one side flange are aligned with fastener receiving holes of the other side flange and with said rail fastener receiving holes, and a locking pin on said locking flange aligned with one of said standard fastener receiving holes; and
   a plurality of fasteners coupling said rails and said standards to said coupling members.

2. The knockdown rack of claim 1 wherein said base is rectangular and has sides and ends and includes side lifting fork receiving means on said sides and end lifting fork receiving means on said ends.

3. The knockdown rack of claim 2 further including stiffeners extending across the width of said rectangular base.

4. The knockdown rack of claim 1 wherein each of said coupling members includes strengthening means.

5. The knockdown rack of claim 4 wherein said strengthening means is diamond-shaped.

6. The knockdown rack of claim 1 wherein each of said coupling members includes a tubular fitting attached to said locking flange for receiving a corner standard therein.

7. The knockdown rack of claim 1 wherein each of said coupling members includes a tie-off fastener mounted on said base, said tie-off fastener including a hollow elongate body having side faces with a multiplicity of fastener receiving holes defined through said side faces.

8. The knockdown rack of claim 7 wherein said tie-off fastener holes are located near the longitudinal center-line of each of said faces and are spaced apart longitudinally of said tie-off fastener.

9. The knockdown rack of claim 8 further including a tie-off bar telescopingly received in said tie-off fastener and including a multiplicity of fastener receiving holes defined therein to be aligned with said tie-off fastener holes for receiving a fastener to couple said tie-off bar to said tie-off fastener.

10. The knockdown rack of claim 1 wherein said locking lip is spaced from said coupling member base so that a corner standard is snugly received between said lip and said base.

11. The knockdown rack of claim 10 wherein said locking flange is spaced from said side flange inner edges a distance greater than the width of a corner standard.

12. The knockdown rack of claim 1 wherein said coupling member side flanges are essentially parallel with each other.

* * * * *